US008771086B2

(12) United States Patent
Yoshida et al.

(10) Patent No.: US 8,771,086 B2
(45) Date of Patent: Jul. 8, 2014

(54) FIXED-TYPE CONSTANT VELOCITY UNIVERSAL JOINT

(75) Inventors: Kazuhiko Yoshida, Iwata (JP); Keisuke Sone, Iwata (JP); Mika Kohara, Iwata (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 13/808,731

(22) PCT Filed: Jul. 19, 2011

(86) PCT No.: PCT/JP2011/066311
§ 371 (c)(1),
(2), (4) Date: Jan. 7, 2013

(87) PCT Pub. No.: WO2012/017815
PCT Pub. Date: Feb. 9, 2012

(65) Prior Publication Data
US 2013/0109483 A1    May 2, 2013

(30) Foreign Application Priority Data

Aug. 5, 2010   (JP) .................................. 2010-176451
Jul. 14, 2011  (JP) .................................. 2011-155637

(51) Int. Cl.
*F16D 3/224*   (2011.01)

(52) U.S. Cl.
USPC .............................. 464/15; 464/145; 464/906

(58) Field of Classification Search
USPC ...................... 464/15, 143, 145, 906; 508/552
See application file for complete search history.

(56) References Cited

U.S. PATENT DOCUMENTS

| 5,604,187 | A | 2/1997 | Takeuchi et al. |
| 6,037,314 | A | 3/2000 | Kondo et al. |
| 6,506,122 | B2 * | 1/2003 | Nakagawa et al. ........... 464/145 |
| 2009/0264208 | A1 | 10/2009 | Ooba et al. |
| 2010/0087261 | A1 | 4/2010 | Kura et al. |
| 2010/0173807 | A1 | 7/2010 | Nagumo et al. |
| 2011/0003645 | A1 | 1/2011 | Ooba et al. |

FOREIGN PATENT DOCUMENTS

| JP | 61-12791 | | 1/1986 |
| JP | 2004-123858 | | 4/2004 |
| JP | 2004123858 | A * | 4/2004 |
| JP | 2005-226038 | | 8/2005 |

(Continued)

OTHER PUBLICATIONS

Surface Roughness Table Engineer's Handbook. Handbook [online]. Engineer's Handbook 2006 [retrieved on Oct. 11, 2010]. Retrieved from the Internet: <URL:www.engineershandbook.com/Tables/surfaceroughness.htm>.*

(Continued)

*Primary Examiner* — Gregory Binda
*Assistant Examiner* — Matthieu Setliff
(74) *Attorney, Agent, or Firm* — Wenderoth, Lind & Ponack, L.L.P.

(57) ABSTRACT

A fixed type constant velocity universal joint comprises a ball and a lubricating grease sealed therein. A surface roughness of the ball is set to Ra 0.15 μm or less and a surface roughness of a counterpart surface on which the ball rolls is set to be higher than the surface roughness of the ball. An additive composition of the lubricating grease comprises a base oil, a diurea compound, molybdenum dithiocarbamate, zinc dialkyldithiophosphate, melamine cyanurate, molybdenum disulfide, and calcium salt of alkylaromatic sulfonic acid.

16 Claims, 4 Drawing Sheets

(56) References Cited

FOREIGN PATENT DOCUMENTS

| | | | | |
|---|---|---|---|---|
| JP | 2005226038 A | * | 8/2005 | |
| JP | 2007-271039 | | 10/2007 | |
| JP | 3988895 | | 10/2007 | |
| JP | 3988897 | | 10/2007 | |
| JP | 2008-69282 | | 3/2008 | |
| JP | 2008-196635 | | 8/2008 | |
| JP | 2008-297402 | | 12/2008 | |
| JP | 2009-121673 | | 6/2009 | |
| JP | 2009121673 A | * | 6/2009 | |
| JP | 2010065194 A | * | 3/2010 | |
| WO | 2005/078053 | | 8/2005 | |

OTHER PUBLICATIONS

International Search Report issued Oct. 18, 2011 in International (PCT) Application No. PCT/JP2011/066311.

International Preliminary Report on Patentability and Written Opinion of the International Searching Authority issued Mar. 21, 2013 in International (PCT) Application No. PCT/JP2011/066311.

* cited by examiner

FIXED-TYPE CONSTANT VELOCITY UNIVERSAL JOINT

BACKGROUND OF THE INVENTION

1. Technical Field

The present invention relates to a fixed type constant velocity universal joint which is used, for example, for a drive shaft of a power transmission device for automobiles and industrial machines.

2. Background Art

As illustrated in FIG. 5, a fixed type constant velocity universal joint includes an outer joint member 3 having an inner surface 1 provided with a plurality of track grooves 2, an inner joint member 6 having an outer surface 4 provided with a plurality of track grooves 5 paired with the track grooves 2 of the outer joint member 3, a plurality of balls 7 for transmitting torque while being interposed between the track grooves 2 of the outer joint member 3 and the track grooves 5 of the inner joint member 6, and a cage 8 for holding the balls 7 while being interposed between the inner surface 1 of the outer joint member 3 and the outer surface 4 of the inner joint member 6. The cage 8 includes a plurality of window portions 9 for housing the balls 7, which are arranged along a circumferential direction.

Further, the outer joint member 3 includes a mouth portion 3a provided with the track grooves 2, and a stem portion 3b projected from a bottom wall 10 of the mouth portion 3a. Female splines 11 are formed in an inner surface of an axial hole of the inner joint member 6, and an end portion of a shaft 12 is fitted to the axial hole of the inner joint member 6. The end portion of the shaft 12 includes male splines 13, and the male splines 13 are fitted to the female splines 11 of the axial hole of the inner joint member 6. Note that, a circumferential groove is formed across end portions of the male splines 13, and a stopper ring 14 as a retaining element is fixed in the circumferential groove.

In this case, the track grooves 2 of the outer joint member 3 each have a center of curvature O1 offset from a joint center O to an opening side of the outer joint member 3 by a predetermined dimension along a joint axial line L in an axial direction. Further, the track grooves 5 of the inner joint member 6 each have a center of curvature O2 offset by a predetermined dimension along the joint axial line L in the axial direction from the joint center O to a depth side opposite with respect to the center of curvature O1 of each of the track grooves 2 of the outer joint member 3. In other words, the center of curvature O1 and the center of curvature O2 are offset from the joint center O to sides opposite to each other by an equal distance along the joint axial line L in the axial direction.

An opening portion of the constant velocity universal joint is sealed with a boot 15. The boot 15 includes a large diameter portion 15a, a small diameter portion 15b, and a bellows portion 15c for coupling the large diameter portion 15a and the small diameter portion 15b to each other. The large diameter portion 15a is externally fitted to a boot fixing portion 17 on the opening portion side of an outer surface of the outer joint member 3, and the large diameter portion 15a thus externally fitted is fastened with a boot band 16. In this way, the large diameter portion 15a is fixed to the boot fixing portion 17 of the outer joint member 3. Further, the shaft 12 is provided with a boot fixing portion 18 provided with a circumferential groove. The small diameter portion 15b of the boot 15 is externally fitted to the boot fixing portion 18, and the small diameter portion 15b thus externally fitted is fastened with another boot band 16.

By the way, in the field of transportation in which $CO_2$ reduction is strongly desired, in particular, with regard to automobile components, longer duration of use and weight reduction have been urgent problems in terms of life cycle assessment (LCA). In order to prolong duration of use, it is particularly necessary to prolong lives of rolling elements, and in order to achieve weight reduction, it is necessary to increase permissible loads of the components under loads. Therefore, there has been a strong demand to prolong the lives of rolling elements.

Further, a half shaft, which is one of drive shafts of an automobile, is used under the following conditions: a condition of low speed rotation at high torque at the time of, for example, slope climbing (hereinafter referred to as high load condition); a condition of high speed rotation at low torque at the time of, for example, traveling on a flat expressway (hereinafter referred to as low load condition); and a condition of creep rotation at low torque at the highest steering angles of wheels (near maximum operating angles of CVJs) (hereinafter referred to as high angle condition). Such typical load modes are repetitively switched to one another, and hence a fixed type constant velocity universal joint using balls as torque transmitting members (hereinafter sometimes referred to as ball fixed type constant velocity universal joint) needs to be sufficiently durable in all the traveling modes. Thus, even when a ball fixed type constant velocity universal joint is excellent in durability under only one of the above-mentioned conditions, such a ball fixed type constant velocity universal joint is insufficient in practical durability. Further, a plunging type constant velocity universal joint is used at operating angles lower than (approximately half of) those of the ball fixed type constant velocity universal joint, and hence, in many cases, can be used for a longer period than that for the ball fixed type constant velocity universal joint. In view of the circumstances, it is particularly desired to prolong lives of rolling elements of the ball fixed type constant velocity universal joint.

Durability cannot be enhanced without consideration of lubricant. A composition of the lubricant is significantly different depending on a product to be used. This is because tribological phenomena significantly vary from each other depending on motional states of components and properties of surfaces, the components and the surfaces being brought into contact with each other. Thus, in order to determine the composition of the lubricant, it is necessary to definitely limit a product in which the lubricant is sealed (for example, ball fixed type constant velocity universal joint for half shafts of automobiles), grasp driving conditions, and take the surface properties of rolling surfaces into consideration.

JP 3988895 B, JP 2004-123858 A, and JP 3988897 B each describe an example of the lubricant to be sealed in constant velocity universal joints. According to the grease compositions described in JP 3988895 B and JP 2004-123858 A, abrasion of constant velocity universal joints is effectively reduced, and occurrence of flaking at lubricating parts is prevented. However, the grease compositions provided in those cases are effective only under the high load condition. Meanwhile, JP 3988897 B describes a grease composition which reduces abrasion of constant velocity universal joints and prevents generation of vibration.

Further, JP 61-12791 A describes a grease composition which improves at least one of the following lubrication parameters: load resistance; abrasion resistance; frictional coefficient; and the like. The grease composition, which is improved in at least one of those parameters, can be effectively used for lubricants for various machines and apparatus poor in those parameters.

However, none of JP 3988895 B, JP 2004-123858 A, and JP 3988897 B above describes surface properties of a contact surface. Practically, tribological phenomena significantly vary from each other depending on motional states of components and properties of surfaces, the components and the surfaces being brought into contact with each other. Thus, in a fixed type constant velocity universal joint which uses balls and is used for a half shaft of an automobile, it is necessary to determine the composition of the lubricant based on driving conditions and in consideration of surface properties of driving surfaces. Further, the grease composition according to JP 61-12791 A is not limited to use for constant velocity universal joints, or not limited at all in terms of the surface properties of the contact surface.

SUMMARY OF THE INVENTION

In view of such circumstances, the present invention has been made to provide a fixed type constant velocity universal joint which can achieve, at low cost, excellent properties in terms of the durability, the high load condition, the low load condition, and the high angle condition.

According to the present invention, there is provided a fixed type constant velocity universal joint comprising: an outer joint member having an inner surface provided with track grooves; an inner joint member having an outer surface provided with a plurality of track grooves paired with the track grooves of the outer joint member; a plurality of balls for transmitting torque, the plurality of balls being interposed between the track grooves of the outer joint member and the plurality of track grooves of the inner joint member; and a cage for holding the plurality of balls, the cage being interposed between the inner surface of the outer joint member and the outer surface of the inner joint member, the fixed type constant velocity universal joint comprising a lubricating grease sealed therein, wherein a surface roughness of each of the plurality of balls is set to Ra 0.15 μm or less, wherein a surface roughness of a counterpart surface on which corresponding one of the plurality of balls rolls is set to be higher than the surface roughness of each of the plurality of balls, and wherein an additive composition of the lubricating grease comprises a base oil, a diurea compound, molybdenum dithiocarbamate, zinc dialkyldithiophosphate, melamine cyanurate, molybdenum disulfide, and calcium salt of alkylaromatic sulfonic acid.

According to the fixed type constant velocity universal joint of the present invention, the surface roughness of each of the plurality of balls is set to Ra 0.15 μm or less, and hence abrasion of contact portions between the plurality of balls and the cage can be reduced. Note that, it is desired that, in terms of tribology, components other than the plurality of balls be finished to have surface roughnesses equivalent to the surface roughness of each of the plurality of balls. However, owing to shapes which occupy large surface areas, and are intermittent and complicated, it is uneconomical to achieve finished surface roughnesses of Ra 0.15 μm or less. Thus, it is economical to set the surface roughnesses of the components other than the plurality of balls to be higher than the surface roughness of each of the balls by finishing surfaces of the components other than the plurality of balls only by a grinding process (leaving grinding marks formed during grinding), formed during quenched-steel trimming (leaving lead marks of trimming), or by leaving the surfaces that have undergone the heat treatment as they are (omitting grinding, trimming, or the like). The preferred surface roughnesses range from Ra 0.4 μm to Ra 1.8 μm.

Under the high load condition, it is necessary for the lubricant to have properties of suppressing abrasion and reducing friction coefficients. Under the low load condition, it is necessary for the lubricant to have properties of promoting initial abrasion (imparting break-in properties), reducing friction coefficients, and dispersing abrasive dust. Further, at high angles, it is necessary for the lubricant to have the properties of suppressing abrasion and reducing friction coefficients.

As described above, the lubricant is required to have contradictory properties, that is, to prevent abrasion under a high load condition and promote initial abrasion under a low load condition. In addition, a contact surface under a high load condition has a high temperature while a contact surface under a low load condition has a low temperature. Accordingly, in order to satisfy the contradictory properties of preventing abrasion and promoting abrasion (imparting break-in properties), a solid lubricant having different effects depending on temperature or bearing conditions is added. Melamine cyanurate (MCA) has a low abrasive action and high abrasion resistance under a high load condition, and thus is added. In addition, in a low shear stress range such as a low load condition, molybdenum disulfide ($MoS_2$) easily acts and has a greater abrasive action than melamine cyanurate has, and thus is also added. A known lubricating mechanism thereof is as follows. Molybdenum disulfide comprises a layered lattice structure being easily sheared through sliding movement into thin layer shapes to decrease a friction coefficient. In addition, molybdenum disulfide is also effective in the prevention of seizure of the constant velocity universal joint.

In addition, in order to decrease a friction coefficient, a molybdenum dithiocarbamate (MoDTC) is added as a friction modifier because it reacts in a higher temperature range. Further, a zinc dialkyldithiophosphate (ZnDTP) is also added as an abrasion modifier because it reacts from a lower temperature range.

ZnDTP is considered to exert an effect of preventing abrasion by being degraded to produce a polyphosphate film on a metal surface, which covers a lubricating surface to form a polymer film having viscoelasticity, thereby absorbing vibration and preventing metal-to-metal contact. These friction modifiers act alone or interact with each other to show high friction and abrasion adjustment performances.

In addition, a calcium salt of an alkylaromatic sulfonic acid (Ca sulfonate) is added (preferably at 0.5 to 3.5% by weight) because it is effective in the dispersion of abrasion powder. The calcium salt of the alkylaromatic sulfonic acid is a calcium salt of a synthetic sulfonic acid such as an alkylaromatic sulfonic acid like dinonylnaphthalenesulfonic acid or an alkylbenzenesulfonic acid, which is known as a metal-based detergent-dispersant or a rust inhibitor to be used for a lubricating oil such as an engine oil. Ca sulfonate is also effective in the dispersion of a solid lubricant.

As a vegetable oil and fat, there are used, for example, castor oil, soybean oil, rapeseed oil, and coconut oil. An oiliness agent formed of one kind of those vegetable oils and fats or a combination of two or more kinds thereof easily adsorbs on a metal surface to prevent contact between metals, and hence is considered to decrease a friction coefficient under a low load condition.

In addition to the above-mentioned components, an antioxidant, a rust inhibitor, an anti-corrosive agent, and the like may be incorporated. The grease composition of the present invention comprises, with respect to the total weight of the grease composition, preferably the base oil as a component at 57.5 to 94.3% by weight, the diurea compound as a component at 1 to 25% by weight, melamine cyanurate as a component at 2 to 4% by weight, molybdenum disulfide at 0.2 to 2.5% by weight, the molybdenum dithiocarbamate at 1 to 3% by weight, the zinc dialkyldithiophosphate at 0.5 to 1.5% by weight, the calcium salt of the alkylaromatic sulfonic acid at 0.5 to 3.5% by weight, and the vegetable oil and fat at 0 to 3% by weight, more preferably the base oil as a component at 57.5 to 94.3% by weight, the diurea compound as a component at 1 to 25% by weight, melamine cyanurate as a component at 2.5 to 3.5% by weight, molybdenum disulfide at 0.2 to 2.5% by weight, the molybdenum dithiocarbamate at 1 to 3% by weight, the zinc dialkyldithiophosphate at 0.5 to 1.5% by weight, the calcium salt of the alkylaromatic sulfonic acid at 0.5 to 3.5% by weight, and the vegetable oil and fat at 0.5 to 3% by weight.

When the content of the diurea compound is less than 1% by weight, the grease composition exhibits less thickening effect and becomes difficult to turn into grease. When the content of the diurea compound is more than 25% by weight, the obtained composition becomes too hard, and the expected effect is difficult to obtain. When the content of melamine cyanurate as a component is less than 2% by weight, the content of the molybdenum dithiocarbamate is less than 1% by weight, the content of the zinc dialkyldithiophosphate is less than 0.5% by weight, or the content of the calcium salt of the alkylaromatic sulfonic acid is less than 0.5% by weight, the expected effect may not be sufficiently obtained in some cases. On the other hand, when the content of melamine cyanurate as a component, the calcium salt of the alkylaromatic sulfonic acid, or the vegetable oil and fat is more than the upper limit, the material provides no increase in effect, but rather, in terms of effect in extending durability life, has the opposite effect. When the content of the molybdenum dithiocarbamate or the zinc dialkyldithiophosphate is more than the upper limit, its addition does not provide a remarkable effect.

The fixed type constant velocity universal joint may comprise a fixed type constant velocity universal joint of an undercut free type in which a bottom surface of each of the track grooves of the outer joint member and a bottom surface of each of the plurality of track grooves of the inner joint member each comprise a curved portion and a straight portion.

In such a fixed type constant velocity universal joint of the undercut free type, a center of curvature of each of the track grooves of the outer joint member and a center of curvature of corresponding one of the plurality of track grooves of the inner joint member may be offset to each other with respect to a joint axial center line to opposite sides in a radial direction by equal distances with respect respectively to corresponding one of the track grooves of the outer joint member and corresponding one of the plurality of track grooves of the inner joint member.

The track grooves of the outer joint member and a shaft interfere with each other on a higher angle side, and hence a higher maximum operating angle can be formed. However, in accordance with an increase of the maximum operating angle, a track depth becomes smaller on a high angle side of a circular-arc portion of each of the track grooves, and hence durability under the high angle condition is deteriorated. As a countermeasure, when the center of curvature of each of the track grooves of the outer joint member and the center of curvature of a corresponding one of the plurality of track grooves of the inner joint member are offset to each other in the radial direction, the depth side of each of the track grooves can be deepened.

It is preferred that a raw material for the cage comprise carbon steel having a carbon content of 0.46% by weight or more and 0.50% by weight or less, the raw material having a core portion which has a hardness of from HRC 56 to HRC 60 after quenching. Further, it is preferred that the plurality of balls comprise eight balls, a spherical angle of the outer joint member be set to range from 17° to 18.5°, and the outer joint member comprise a spherical inlet provided with cutout portions for incorporation of the cage.

The fixed type constant velocity universal joint according to the present invention is capable of achieving, at low cost, excellent properties in terms of the durability, the high load condition, the low load condition, and the high angle condition. By limiting the contents of the additive composition of the lubricating grease as described above, low load durability can be further enhanced. By using a mineral oil as the base oil of the additive composition, cost reduction can be achieved.

By employment of the undercut free type, a higher maximum operating angle can be formed. In addition, the lubricating grease having the above-mentioned additive composition is sealed inside the joint, and hence deterioration in durability under the high angle condition can be prevented. Further, by the offsets in the radial direction, the depth side of the track groove can be deepened. Combination of this structure and the above-mentioned lubricating grease enables high angle durability equivalent to that in a Birfield type to be secured, the Birfield type being unable to form the high maximum operating angle.

By limiting the raw material for the cage as described above, strength and durability of the fixed type constant velocity universal joint can be enhanced. When the carbon content is smaller than a lower limit of the above-mentioned range, the hardness decreases, and abrasion resistance is significantly deteriorated. Meanwhile, when the carbon content exceeds an upper limit of the above-mentioned range, it is difficult to perform a pressing process for punching out the windows in the cage, which may cause a problem of significant deterioration in dimensional accuracy of a pressed surface. Further, when the hardness of the core portion is lower than a lower limit of the above-mentioned range, enhancement in strength cannot be observed.

By setting the spherical angle of the outer joint member to range from 17° to 18.5°, the strength of the cage is further enhanced and the durability thereof is markedly enhanced. This is because the spherical portion has functions to hold the cage and to reinforce the cage. Further, the higher spherical angle suppresses offsets of the cage, the inner joint member, and the balls from a constant velocity bisecting plane, and hence durability is enhanced. Further, the number of balls is increased to eight, and hence a diameter of each of the balls can be reduced. Thus, without sacrificing operability, offset amounts can be reduced as well, and sliding of the outer joint member and the balls can be markedly suppressed.

Normally, the outer joint member is formed by subjecting carbon steel S53C or carbon steel equivalent thereto to induction hardening, and the inner joint member is formed by carburizing-and-quenching. Thus, softening resistance of the outer joint member is low, and hence, through driving, a hardness thereof is liable to be reduced as compared to a hardness of the inner joint member. Thus, under the same load condition, a life of the constant velocity universal joint depends on a life of a ball fixed type outer joint member. Therefore, by increasing the number of the balls to eight, the life of the outer joint member can be further prolonged. As a result, enhancements in strength and durability, downsizing, and weight reduction can be achieved.

By the way, although the higher spherical angle hinders incorporation of the cage into the outer joint member, when the cutout portions for incorporation of the cage are provided to the spherical inlet, the incorporation can be facilitated. Further, when the cutout portions for the incorporation, which can be processed by lathing, are processed by forging, costs become markedly higher. Spherical angles smaller than the lower limit reduce effects, and spherical angles larger than the upper limit not only cause a sharp increase in processing cost for the cutout portions for the incorporation, but also hinder the forging process.

DETAILED DESCRIPTION OF THE INVENTION

In the following, description is made of embodiments of the present invention with reference to the drawings.

Figure 1:
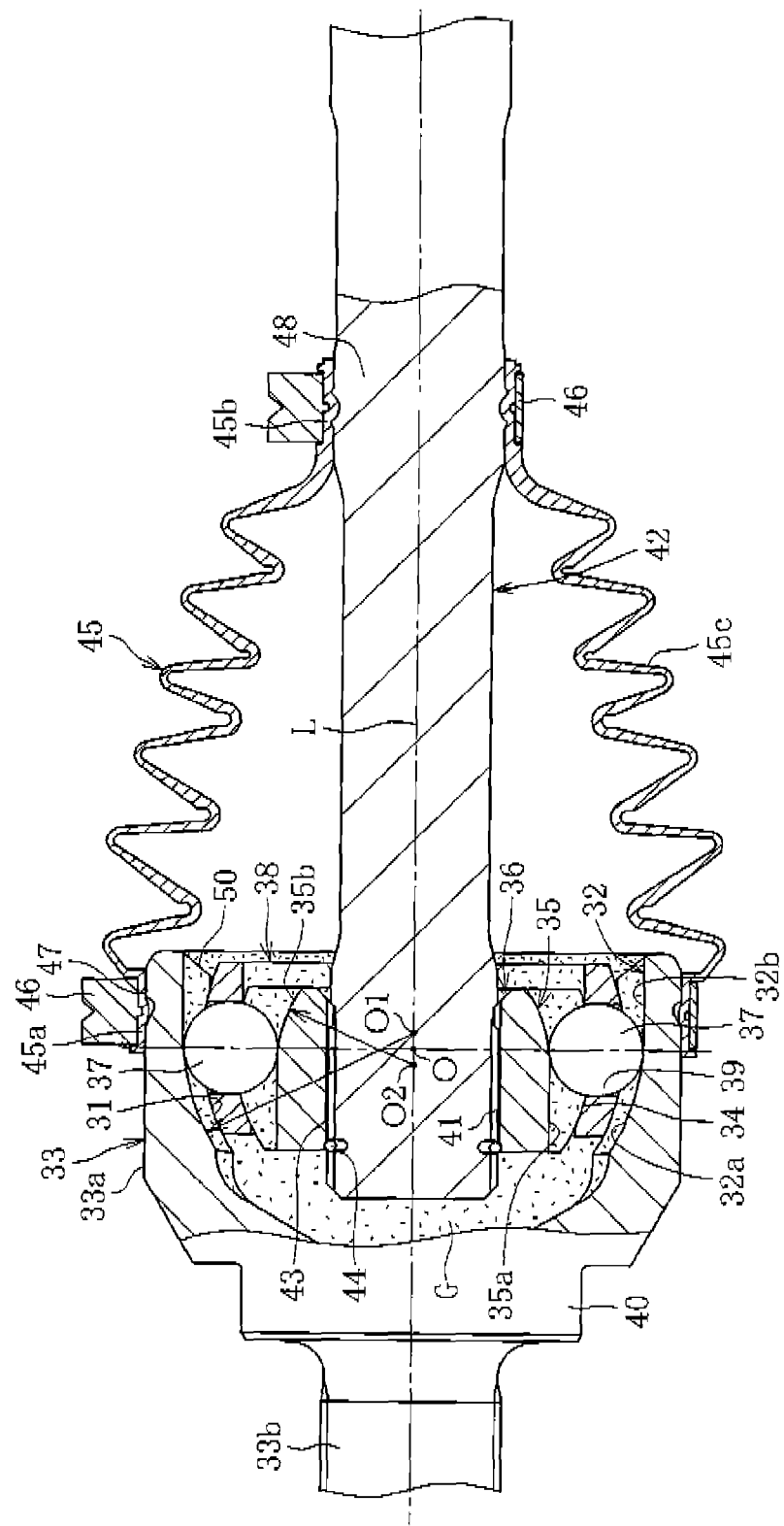
FIG. 1 A sectional view of a constant velocity universal joint according to an embodiment of the present invention.
Figure 2:
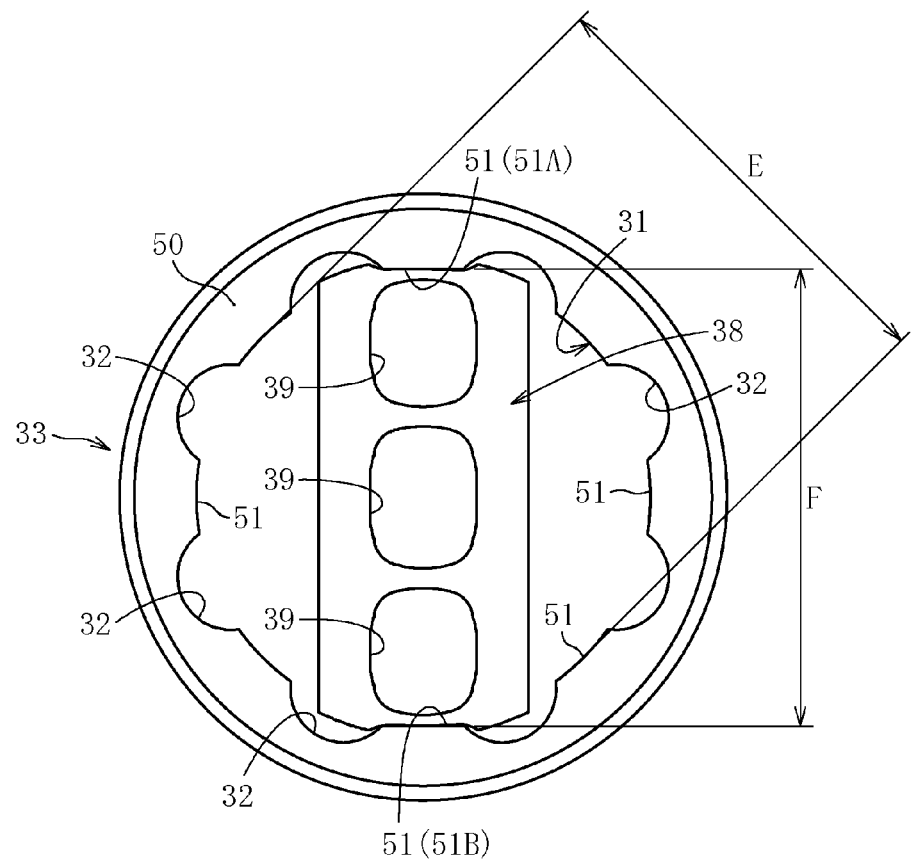
FIG. 2 An explanatory view of a dimensional relationship between an outer joint member and a cage of the constant velocity universal joint.
Figure 3:
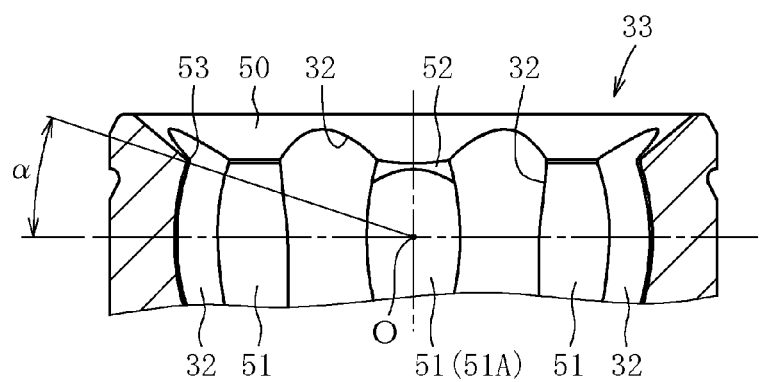
FIG. 3 A main-part sectional view of the outer joint member of the constant velocity universal joint.

FIG. 1 illustrates a fixed type constant velocity universal joint according to the present invention. The fixed type constant velocity universal joint is of an undercut free type, and comprises an outer joint member 33 having an inner surface 31 provided with a plurality of track grooves 32, an inner joint member 36 having an outer surface 34 provided with a plurality of track grooves 35 paired with the track grooves 32 of the outer joint member 33, a plurality of balls 37 for transmitting torque while being interposed between the track grooves 32 of the outer joint member 33 and the track grooves 35 of the inner joint member 36, and a cage 38 for holding the balls 37 while being interposed between the inner surface 31 of the outer joint member 33 and the outer surface 34 of the inner joint member 36. The cage 38 comprises a plurality of window portions 39 for housing the balls 37, which are arranged along a circumferential direction. In this case, eight track grooves 32 and eight track grooves 35 are formed in the outer joint member 33 and the inner joint member 36, respectively, the eight track grooves 32 and the eight track grooves 35 being formed at 45° pitches in the circumferential direction. The number of balls is eight. Thus, as illustrated in FIGS. 2 and 3, the outer joint member 33 is provided with eight inner surface forming surfaces 51 formed between the track grooves at 45° pitches in the circumferential direction.

Further, the outer joint member 33 comprises a mouth portion 33a provided with the track grooves 32, and a stem portion 33b projected from a bottom wall 40 of the mouth portion 33a. Female splines 41 are formed in an inner surface of an axial hole of the inner joint member 36, and an end portion of a shaft 42 is fitted to the axial hole of the inner joint member 36. The end portion of the shaft 42 comprises male splines 43, and the male splines 43 are fitted to the female splines 41 of the axial hole of the inner joint member 36. Note that, a circumferential groove is formed across end portions of the male splines 43, and a stopper ring 44 as a retaining element is fixed in the circumferential groove.

A groove bottom surface of the track groove 32 of the outer joint member 33 comprises a curved portion 32a on a depth side and a straight portion 32b on an opening side (extending parallel to a joint axial line L). Further, the groove bottom surface of the track groove 35 of the inner joint member 36 comprises a straight portion 35a on the depth side (extending parallel to the joint axial line L) and a curved portion 35b on the opening side. The curved portion 32a of the track groove 32 has a center of curvature O1 offset from a joint center O to the opening side of the outer joint member 33 by a predetermined dimension in an axial direction. Further, the curved portion 35b of the track groove 35 has a center of curvature O2 offset in the axial direction by a predetermined dimension from the joint center O to the depth side opposite with respect to the center of curvature O1 of the curved portion 32a of the outer joint member 33. In other words, the center of curvature O1 and the center of curvature O2 are offset from the joint center O to sides opposite to each other by an equal distance along the joint axial line L in the axial direction. The constant velocity universal joint has a lubricating grease G sealed therein.

An opening portion of the constant velocity universal joint is sealed with a boot 45. The boot 45 comprises a large diameter portion 45a, a small diameter portion 45b, and a bellows portion 45c for coupling the large diameter portion 45a and the small diameter portion 45b to each other. The large diameter portion 45a is externally fitted to a boot fixing portion 47 on the opening portion side of an outer surface of the outer joint member 33, and the large diameter portion 45a thus externally fitted is fastened with a boot band 46. In this way, the large diameter portion 45a is fixed to the boot fixing portion 47 of the outer joint member 33. Further, the shaft 42 comprises a boot fixing portion 48 provided with a circumferential groove. The small diameter portion 45b of the boot 45 is externally fitted to the boot fixing portion 48, and the small diameter portion 45b thus externally fitted is fastened with another boot band 46.

By the way, a chamfer 50 as illustrated in FIGS. 2 and 3 is formed along an opening end surface of the mouth portion 33a of the outer joint member 33. Further, cutout portions 52 are formed at respective opening ends of a pair of inner surface forming surfaces 51A and 51B facing each other. Thus, a relation F>E is established, where E is an opening end-to-end dimension between a pair of the inner surface forming surfaces 51 and 51 facing each other and corresponding to parts free from the cutout portions 52, and F is an opening end-to-end dimension between the pair of inner surface forming surfaces 51A and 51B facing each other (opening end-to-end dimension between the cutout portions 52).

A spherical angle α of the outer joint member 33 is set to range from 17° to 18.5°. Here, the "spherical angle" refers to an axial angle formed, as illustrated in FIG. 3, by an end portion on the joint opening side of the inner surface 31 with respect to an inner spherical (inner surface) center (joint center) 0 of the outer joint member 33.

Further, a component having lowest strength among components of the ball fixed type constant velocity universal joint is the cage 38. In many cases, the cage 38 to be used is formed by carburizing-and-quenching. The carburizing process is advantageous to increase abrasion resistance and softening resistance. However, a carbon content after the carburizing process is high, specifically, approximately 1.0% by weight, and hence toughness of a component provided with a cutout is significantly deteriorated. Deterioration in toughness may cause a problem with safety upon risk avoidance. Specifically, the joint is brittle and hence may be broken by an impact load thereon, which may instantaneously disable torque transmission.

Thus, in the present invention, steel having a carbon content of 0.46% by weight or more and 0.50% by weight or less is quenched so that the carbon content after the quenching reaches half of a surface carbon content (0.9 to 1.1% by weight) of the carburized steel and a hardness of a core portion reaches HRC 52 or more. With this, toughness and strength of the cage 38 are markedly enhanced, with the result that a fixed type joint for use at high angles, which is excellent in both strength and durability, can be provided. When the carbon content is smaller than a lower limit of the above-mentioned range, the hardness decreases, and abrasion resistance is significantly deteriorated. Meanwhile, when the carbon content exceeds an upper limit of the above-mentioned range, it is difficult to perform a pressing process for punching out the windows in the cage 38, which may cause a problem of significant deterioration in dimensional accuracy of a pressed surface. Further, when the hardness of the core portion is lower than a lower limit of the above-mentioned range, enhancement in strength cannot be observed.

By the way, generally, in terms of smoothness of operation of the joint and uniformity of load application to the balls, it is necessary to give the greatest consideration to finishing accuracy of the balls of the fixed type constant velocity universal joint (fixed type constant velocity universal joint using balls as torque transmitting members). Thus, the balls are processed into smooth spheres through the following steps: heat treatment; polishing in a manner that an upper flat plate and a lower flat plate are moved relative to each other under a state in which the balls are interposed therebetween together with a polishing agent; and lapping thereafter. Thus, the balls can be processed in large numbers in a single process, and hence a cost increase is small even when finished surface roughness is suppressed.

Thus, in the present invention, a surface roughness of the balls 37 is set to Ra 0.15 μm or less. When the surface roughness exceeds Ra 0.15 μm, the balls 37 are held in point contact with the cage 38, and hence rolling surfaces of the cage 38 are much more liable to be abraded, which may cause generation of abnormal noise during driving.

It is desired that, in terms of tribology, components other than the balls be finished to have surface roughnesses equivalent to the surface roughness of the balls 37. However, owing to shapes which occupy large surface areas, and are intermittent and complicated, it is uneconomical to achieve finished surface roughnesses of Ra 0.15 μm or less. Thus, it is economical to set the surface roughnesses of the components other than the balls to be higher than the surface roughness of the balls by finishing surfaces of the components other than the balls only by a grinding process (leaving grinding marks formed during grinding), quenched-steel trimming (leaving lead marks of trimming), or by leaving the surfaces that have undergone the heat treatment as they are (omitting grinding, trimming, or the like). The preferred surface roughnesses range from Ra 0.4 μm to Ra 1.8 μm. Note that, a shot-blasting process or a tumbling process may be performed after the grinding process.

On a premise of such a surface shape economical in terms of the tribology, it is significantly important to find lubricant compositions suitable to the premise. In this way, efficient and economical lubrication can be performed. Further, in order to determine the composition, it is necessary to grasp in detail a damaged condition of the fixed type constant velocity universal joint (fixed type constant velocity universal joint using balls as torque transmitting members). In view of the circumstances, the damaged condition was carefully observed over time and extensive studies were conducted thereon.

As a result, under a high load condition, the fixed type constant velocity universal joint reaches the end of life by peeling of the tracks of the outer joint member and the inner joint member. Under the high load condition, the fixed type constant velocity universal joint is operated under a boundary lubrication condition, and high shearing stress onto surfaces of the balls, which is generated by rolling and sliding movement of the balls, is a cause of repeated softening and abrasion of surface layers. Those results proved that, under the high load condition, shear cracks were generated and propagated in the surfaces, to thereby cause macroscopic peeling. Thus, it is necessary for a lubricant to have properties of suppressing abrasion and reducing friction coefficients.

Under a low load condition, the fixed type constant velocity universal joint reaches the end of life by peeling of the balls. Results of observation over time under the low load condition of tracks of inner joint members and outer joint members of relatively short-life ball fixed type constant velocity universal joints proved that fixed type constant velocity universal joints comprising tracks having many grinding marks left thereon had short lives. Further, the results also proved that, abrasion of the tracks ceased in an initial phase of driving (break-in period) or subsequent phases. Results of more detailed research proved that, after break-in was completed under the low load condition, the ball fixed type constant velocity universal joint was more likely to be driven under a fluid lubrication condition. In other words, the results proved the following: when break-in properties are deteriorated, the fluid lubrication condition was not achieved; the grinding marks of the tracks scratched surfaces of the balls; and cracks were generated from the scratches and propagated to peel the balls. Further, as another factor of generating cracks, the results proved that abrasive dust generated by abrasive wear at the time of break-in struck the balls and formed flaws, and cracks were generated from those parts and propagated to peel the balls. Thus, it is necessary for the lubricant to have not only the property of reducing friction coefficients but also properties of promoting initial abrasion (imparting break-in properties) and dispersing the abrasive dust.

Under a high angle condition, the fixed type constant velocity universal joint reaches the end of life owing to chipping of shoulder portions of the tracks of the inner joint member. Under the high angle condition, in the ball fixed type constant velocity universal joint, a track depth (depth from a bottom of the track to the spherical surface) on the track depth becomes smaller toward the offset side because a center of the track is offset in the axial direction with respect to a spherical center. Thus, a contact ellipse of the track and the ball climbs onto the shoulder portions of the track, and hence stress is concentrated on the shoulder portions. As a result, the shoulder portions of the track of the inner joint member are chipped even having undergone carburizing-and-quenching.

In many cases, the outer joint member is formed by subjecting medium carbon steel (JIS S53C or S48C) to induction hardening. In such cases, a carbon content of a surface of the outer joint member is approximately half of a carbon content of a surface of an outer joint member that has undergone carburizing-and-quenching. Thus, it was found that toughness of shoulder portions of the outer joint member was higher than toughness of shoulder portions of the inner joint member, and hence the shoulder portions of the outer joint member were less liable to be chipped and remained in an elastic deformation state. Further, it was found that, in accordance with the progress of abrasion of the tracks, the balls were more liable to climb onto the shoulder portions, and induced generation of chipping. Thus, it is necessary for the lubricant to have the properties of suppressing abrasion and reducing friction coefficients.

Consequently, under the high load condition, it is necessary for the lubricant to have the properties of suppressing abrasion and reducing friction coefficients. Under the low load condition, it is necessary for the lubricant to have the properties of promoting initial abrasion (imparting break-in properties), reducing friction coefficients, and dispersing the abrasive dust. Further, at high angles, it is necessary for the lubricant to have the properties of suppressing abrasion and reducing friction coefficients. Note that, the high angle condition is conceived to be the same as the high load condition, and hence lubricating compositions may be determined only in consideration of the high load condition and the low load condition.

In other words, it is necessary for the lubricant to have contradictory properties: a property of preventing abrasion under high loads; and a property of promoting initial abrasion under low loads. Results of research on variation in hardness of contact surfaces under high loads and low loads proved that a temperature of the contact surfaces under high loads was high, and a temperature of the contact surfaces under low loads was low. In view of the circumstances, in order to satisfy the contradictory properties of preventing abrasion and promoting abrasion (imparting break-in properties), a solid lubricant having different effects depending on a temperature and a surface pressure condition is added. Melamine cyanurate (MCA) is found to have a low abrasive action and high abrasion resistance under a high load condition, and thus is added. Melamine cyanurate is easily precipitated as a white precipitate, for example, when an aqueous solution of melamine and an aqueous solution of cyanuric acid or isocyanuric acid are mixed. Melamine cyanurate is generally commercially available as white fine powder having an average particle diameter of 1 to 2 μm. In melamine cyanurate, melamine molecules and cyanuric acid molecules each having a six-membered ring structure are arranged planarly by being tightly bonded through hydrogen bonds, and those planes are overlapped with each other in a layer form by weak bonding force. By virtue of this, it is assumed that melamine cyanurate has cleavage property as with molybdenum disulfide, and it is considered that melamine cyanurate gives excellent lubricity. In addition, molybdenum disulfide ($MoS_2$) is found to, in a low shear stress range such as a low load condition, easily act and have a greater abrasive action than melamine cyanurate has, and thus is also added. Molybdenum disulfide is generally widely used as an extreme pressure additive. A known lubricating mechanism is as follows. Molybdenum disulfide comprises a layered lattice structure being easily sheared through sliding movement into thin layer shapes to decrease a friction coefficient. In addition, molybdenum disulfide is also effective in the prevention of seizure of the constant velocity universal joint.

In addition, a molybdenum dithiocarbamate (MoDTC) reacts in a higher temperature range. Accordingly, in order to decrease a friction coefficient, the molybdenum dithiocarbamate is added as a friction modifier. Further, a zinc dialkyldithiophosphate (ZnDTP) is also added as an abrasion modifier because it reacts from a lower temperature range.

ZnDTP is degraded to produce a polyphosphate film on a metal surface. This film covers a lubricating surface so that a polymer film having viscoelasticity is formed. It is considered that, by virtue of this, an effect of preventing abrasion is exerted by absorbing vibration and preventing metal-to-metal contact. The friction modifiers act alone or interact with each other to show high friction and abrasion adjustment performances.

In addition, a calcium salt of an alkylaromatic sulfonic acid (Ca sulfonate) is found to be effective in the dispersion of abrasion powder, and thus is added (preferably at 0.5 to 3.5% by weight). The calcium salt of the alkylaromatic sulfonic acid is a calcium salt of a synthetic sulfonic acid such as an alkylaromatic sulfonic acid like dinonylnaphthalenesulfonic acid or an alkylbenzenesulfonic acid, which is known as a metal-based detergent-dispersant or a rust inhibitor to be used for a lubricating oil such as an engine oil. Ca sulfonate is also effective in the dispersion of a solid lubricant.

As a vegetable oil and fat, there are used, for example, castor oil, soybean oil, rapeseed oil, and coconut oil. An oiliness agent formed of one kind of those vegetable oils and fats or a combination of two or more kinds thereof easily adsorbs on a metal surface to prevent contact between metals, and is considered to decrease a friction coefficient under a low load condition. In addition to the above-mentioned components, an antioxidant, a rust inhibitor, an anti-corrosive agent, and the like may be incorporated.

The grease composition of the present invention comprises, with respect to the total weight of the grease composition, preferably a base oil as a component at 57.5 to 94.3% by weight, a diurea compound as a component at 1 to 25% by weight, melamine cyanurate as a component at 2 to 4% by weight, molybdenum disulfide at 0.2 to 2.5% by weight, the molybdenum dithiocarbamate at 1 to 3% by weight, the zinc dialkyldithiophosphate at 0.5 to 1.5% by weight, the calcium salt of the alkylaromatic sulfonic acid at 0.5 to 3.5% by weight, and the vegetable oil and fat at 0 to 3% by weight, more preferably a base oil as a component at 57.5 to 94.3% by weight, a diurea compound as a component at 1 to 25% by weight, melamine cyanurate as a component at 2.5 to 3.5% by weight, molybdenumdisulfide at 0.2 to 2.5% by weight, the molybdenum dithiocarbamate at 1 to 3% by weight, the zinc dialkyldithiophosphate at 0.5 to 1.5% by weight, the calcium salt of the alkylaromatic sulfonic acid at 0.5 to 3.5% by weight, and the vegetable oil and fat at 0.5 to 3% by weight.

When the content of the diurea compound is less than 1% by weight, the grease composition exhibits less thickening effect and becomes difficult to turn into grease. When the content of the diurea compound is more than 25% by weight, the obtained composition becomes too hard, and the expected effect is difficult to obtain. When the content of melamine cyanurate as a component is less than 2% by weight, the content of the molybdenum dithiocarbamate is less than 1% by weight, the content of the zinc dialkyldithiophosphate is less than 0.5% by weight, or the content of the calcium salt of the alkylaromatic sulfonic acid is less than 0.5% by weight, the expected effect may not be sufficiently obtained in some cases. On the other hand, when the content of melamine cyanurate as a component, the calcium salt of the alkylaromatic sulfonic acid, or the vegetable oil and fat is more than the upper limit, the material provides no increase in effect, but rather, in terms of effect in extending durability life, has the opposite effect. When the content of the molybdenum dithiocarbamate or the zinc dialkyldithiophosphate is more than the upper limit, its addition does not provide a remarkable effect.

The base oil is not particularly limited. Examples of the base oil include, but not limited to, commonly used lubricating oils such as mineral oils and synthetic oils (e.g., an ester-based synthetic oil, an ether-based synthetic oil, and a hydrocarbon-based synthetic oil) and mixed oils thereof. Economically, a mineral oil is preferred, but in consideration of heat resistance, a synthetic oil may be used.

As a thickener to be used in the present invention, a urea-based thickener is preferred. Examples of the urea-based thickener include, but not limited to, a diurea compound and a polyurea compound. The diurea compound is obtained by, for example, a reaction of a diisocyanate and a monoamine. Examples of the diisocyanate include phenylene diisocyanate, diphenyl diisocyanate, phenyl diisocyanate, diphenylmethane diisocyanate, octadecane diisocyanate, decane diisocyanate, and hexane diisocyanate. Examples of the monoamine include octylamine, dodecylamine, hexadecylamine, octadecylamine, oleylamine, aniline, p-toluidine, and cyclohexylamine. The polyurea compound is obtained by, for example, a reaction of a diisocyanate, a monoamine, and a diamine. Examples of the diisocyanate and the monoamine include the same examples as those described for the production of the diurea compound, and examples of the diamine include ethylenediamine, propanediamine, butanediamine, hexanediamine, octanediamine, phenylenediamine, tolylenediamine, and xylenediamine.

Melamine cyanurate is an adduct of melamine and cyanuric acid. Cyanuric acid is a tautomer of isocyanuric acid, and a generally commercially available melamine cyanurate is an adduct of 1 mole of melamine and 1 mole of cyanuric acid, and is in the form of melamine isocyanurate. The term "melamine cyanurate" as used herein means an adduct of melamine and cyanuric acid or isocyanuric acid. Melamine cyanurate is easily precipitated as a white precipitate, for example, when an aqueous solution of melamine and an aqueous solution of cyanuric acid or isocyanuric acid are mixed. Melamine cyanurate is generally commercially available as white fine powder having an average particle diameter of 1 to 2 μm.

Molybdenum disulfide is generally widely used as an extreme pressure additive. A preferred example of the molybdenum dithiocarbamate is a molybdenum dithiocarbamate represented by the following formula:

[Chem. 1]

(in the formula, $R^3$ and $R^4$ each independently represent an alkyl group having 1 to 24 carbon atoms, preferably 3 to 18 carbon atoms, m represents 0 to 3, n represents 1 to 4, and m+n=4).

The zinc dialkyldithiophosphate is preferably a zinc dialkyldithiophosphate represented by the following general formula:

[Chem. 2]

(in the formula, $R^2$ represents a primary or secondary alkyl group having 1 to 24 carbon atoms or an aryl group having 6 to 30 carbon atoms, particularly preferably a primary or secondary alkyl group having 3 to 8 carbon atoms).

The calcium salt of the alkylaromatic sulfonic acid is a calcium salt of a synthetic sulfonic acid such as an alkylaromatic sulfonic acid like dinonylnaphthalenesulfonic acid or an alkylbenzenesulfonic acid, which is used for a lubricating oil such as engine oil. As the vegetable oil and fat, there are used, for example, castor oil, soybean oil, rapeseed oil, and coconut oil. Those vegetable oils and fats may be used alone, or two or more kinds thereof may be used in combination.

In the constant velocity universal joint illustrated in FIG. 1, the track grooves 32 and 35 of the outer joint member 33 and the inner joint member 36 are partially formed to be straight, and hence can be easily processed by forging. Further, higher dimensional accuracies can be achieved through forging, and hence it is possible to omit finishing the track grooves 32 and 35 that have undergone heat treatment or to markedly save a machining amount of the finishing. As a result, economical properties become higher. Still further, the track groove 32 of the outer joint member 33 and the shaft 42 interfere with each other on a higher angle side, and hence a higher maximum operating angle can be formed.

In addition, the spherical angle α of the outer joint member 33 (refer to FIG. 2) is set to range from 17° to 18.5°, and hence the strength of the cage 38 is further enhanced and durability thereof is markedly enhanced. This is because the spherical portion has functions to hold the cage 38 and to reinforce the cage 38. Further, the higher spherical angle suppresses offsets of the cage 38, the inner joint member 36, and the balls 37 from a constant velocity bisecting plane, and hence durability is enhanced. Further, the number of balls is increased to eight, and hence a diameter of each of the balls can be reduced. Thus, without sacrificing operability, offset amounts can be reduced as well, and sliding of the outer joint member 33 and the balls 37 can be markedly suppressed.

Normally, the outer joint member 33 is formed by subjecting carbon steel S53C or carbon steel equivalent thereto to induction hardening, and the inner joint member 36 is formed by carburizing-and-quenching. Thus, softening resistance of the outer joint member 33 is low, and hence, through driving, a hardness thereof is liable to be reduced as compared to a hardness of the inner joint member 36. Thus, under the same load condition, a life of the constant velocity universal joint depends on a life of the outer joint member 33. Therefore, by increasing the number of the balls to eight, the life of the outer joint member 33 can be further prolonged. As a result, enhancements in strength and durability, downsizing, and weight reduction can be achieved. Note that, although the higher spherical angle hinders incorporation of the cage 38 into the outer joint member 33, when the cutout portions 52 for incorporation of the cage are provided to a spherical inlet, the incorporation can be facilitated. Further, when the cutout portions 52 for the incorporation, which can be processed by lathing, are processed by forging, economical properties become markedly higher. Spherical angles smaller than a lower limit reduce effects, and spherical angles larger than an upper limit not only cause a sharp increase in processing cost for the cutout portions 52 for the incorporation, but also hinder the forging process.

Figure 4:
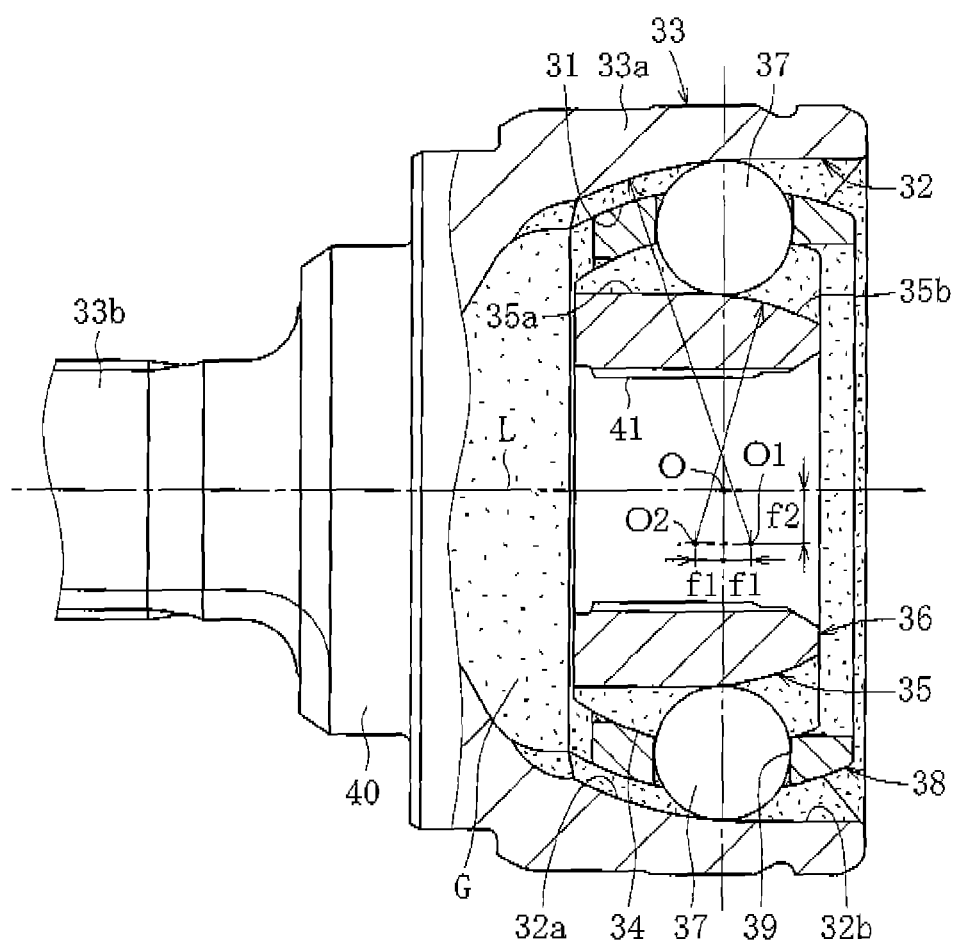
FIG. 4 A sectional view of a constant velocity universal joint according to another embodiment of the present invention.

Next, FIG. 4 illustrates another embodiment of the present invention. In a fixed type constant velocity universal joint according to this embodiment, the center of curvature O1 and the center of curvature O2 are offset to each other from the joint center O to the opposite sides by equal distances f1 in the axial direction. Meanwhile, the center of curvature O1 and the center of curvature O2 are offset to each other with respect to a joint axial center line to the opposite sides in the radial direction by equal distances f2 with respect to respective track grooves.

Other structural details of the constant velocity universal joint illustrated in FIG. 4 are the same as those of the above-mentioned constant velocity universal joint illustrated in FIG. 1. Thus, the same components (members) as those illustrated in FIG. 1 are denoted by the same reference symbols as those in FIG. 1, and the descriptions thereof are omitted. In other words, the constant velocity universal joint illustrated in FIG. 4 has the same functions and advantages as those of the constant velocity universal joint illustrated in FIG. 1.

Figure 5:
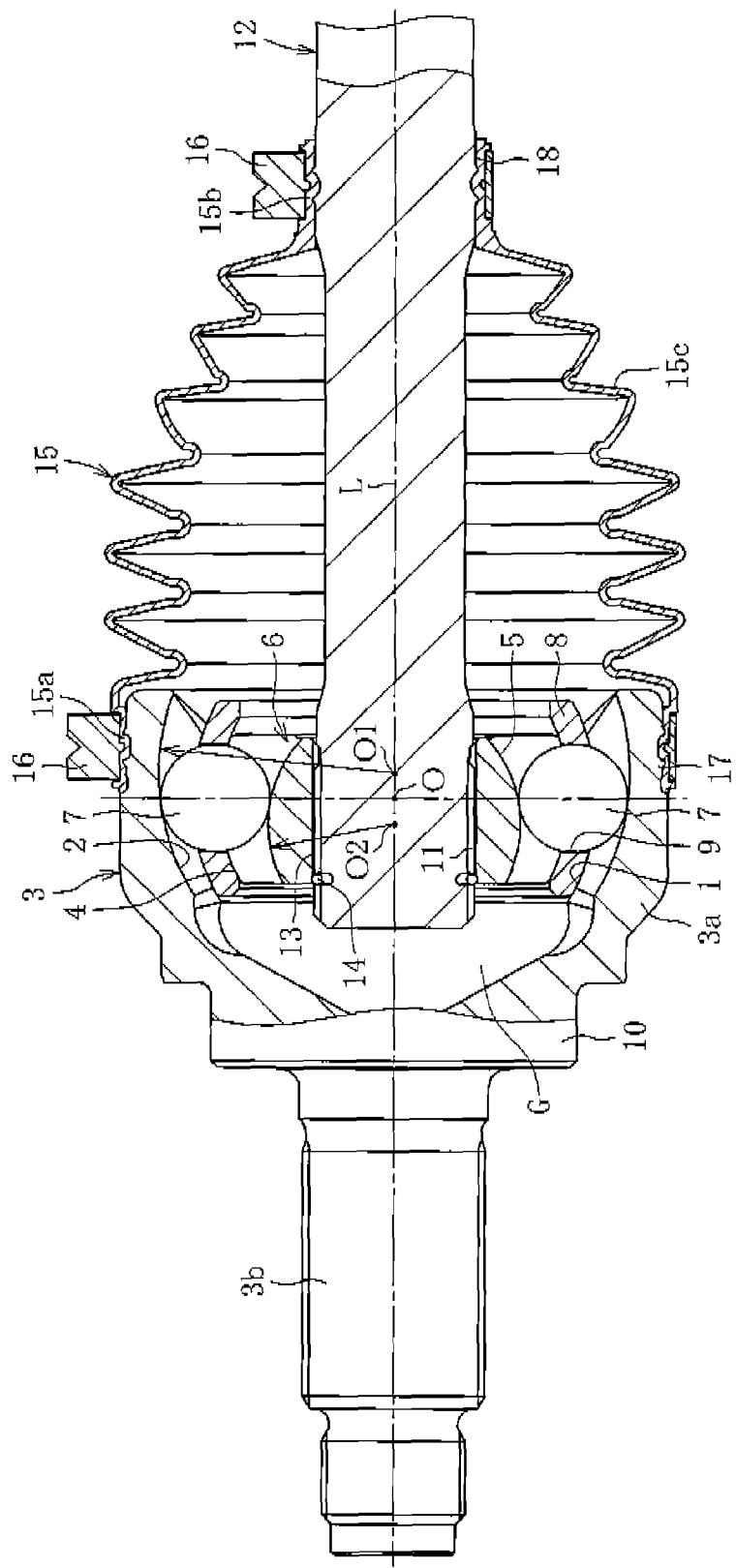
FIG. 5 A sectional view of a conventional constant velocity universal joint.

By the way, employment of an undercut free type is advantageous in that a higher maximum operating angle is formed on a high angle side of a track comprising a circular-arc portion. Meanwhile, the track depth becomes smaller, and-hence durability under the high angle condition is deteriorated. However, by sealing the grease of the present invention, deterioration of the durability under the high angle condition can be prevented. In consideration of the low durability under the high angle condition of the constant velocity universal joint of the undercut free type, as illustrated in FIG. 4, the tracks are offset also in the radial direction so that a shallow part on the depth side of the track can be deepened. Combination of this structure and the grease of the present invention enables high angle durability equivalent to that in a Birfield type illustrated in FIG. 5 to be secured, the Birfield type being unable to form the high maximum operating angle.

With regard to the description hereinabove of the embodiments of the present invention, the present invention is not limited to the above-mentioned embodiments, and various modifications may be made thereto. For example, the fixed type constant velocity universal joint is not limited to a fixed type constant velocity universal joint of the undercut free type, and may comprise a fixed type constant velocity universal joint of the Birfield type. Further, as described above, the preferred number of the balls is eight, but the number of the balls is not limited to eight.

TABLE 1

| | Material | C | Si | Mn | P | S | Cr | Unit: % by weight Hardness of core portion after quenching |
|---|---|---|---|---|---|---|---|---|
| Outer joint member | S53C | 0.52 | 0.20 | 0.89 | 0.010 | 0.006 | 0.10 | |
| Inner joint member | SCr420 | 0.21 | 0.21 | 0.70 | 0.012 | 0.013 | 0.98 | |
| First cage | S48C | 0.47 | 0.21 | 0.86 | 0.009 | 0.007 | 0.12 | HRc56 |
| Second cage | SCr415 | 0.14 | 0.22 | 0.72 | 0.010 | 0.015 | 1.03 | HRc40 |
| Ball | SUJ2 | 0.98 | 0.21 | 0.02 | 0.010 | 0.010 | 1.05 | |

Table 2 below shows manufacturing methods for components of the inventive products and the comparative products. With reference to Table 2, a first ball has a surface roughness of 0.08 μm as shown in Table 4 below, and a second ball has a surface roughness of 0.16 μm as shown in Table 4. As shown in Table 2, first lapping and second lapping 2 are different from each other only in processing time period.

TABLE 2

| Member | Manufacturing method | Application |
|---|---|---|
| Outer joint member | Raw material cutting, Semi-hot forging and cold forging, Lathing and forming, Induction hardening, Grinding process | All Comparative Examples and all Examples |
| Inner joint member | Raw material cutting, Cold forging, Lathing and broaching, Carburizing-and-quenching, Grinding | All Comparative Examples and all Examples |
| First cage | Raw material cutting, Upsetting, Lathing, Window punch-out pressing, Window shaving, Quenching, Grinding | All Examples |
| Second cage | Raw material cutting, Upsetting, Lathing, Window punch-out pressing, Window shaving, Carburizing-and-quenching, Grinding | All Comparative Examples |
| First ball | Stamping, Flushing, Polishing, Quenching, Polishing, First lapping | |
| Second ball | Stamping, Flushing, Polishing, Quenching, Polishing, Second Lapping | Processing time period is shorter than first lapping |

Next, an example is described. Inventive products 1, 2, 3, and 4 and comparative products 1, 2, and 3 were prepared, and high load durability, low load durability, high angle durability, and transmission efficiency of each of those inventive products and comparative products were examined. Materials for components (outer joint member, inner joint member, cage, and balls) of those inventive products and comparative products are shown in Table 1. Hardnesses after heat treatment of the track grooves 32 of the outer joint member 33, the track grooves 35 of the inner joint member 36, the ball contact surfaces of the window portions 39 of the cage 38, and the balls 37 were respectively HRC 60.1, HRC 61.7, HRC 62.0, and HRC 65.1. Further, after those components were maintained at 200° C. for one hour, reduction in hardness was measured. As a result, the hardnesses of the track grooves 32 of the outer joint member 33, the track grooves 35 of the inner joint member 36, the ball contact surfaces of the window portions 39 of the cage 38, and the balls 37 were respectively HRC 58.2, HRC 60.5, HRC 60.8, and HRC 64.5. Those results proved that the outer joint member 33 formed by induction hardening had the lowest softening resistance.

In addition, in the preparation of the lubricating grease of each of the inventive products 1, 2, and 3 and the comparative products 1, 2, and 3, grease was obtained by causing 60.6 g of diphenylmethane-4,4'-diisocyanate, 31.3 g of octylamine, and 66.2 g of stearylamine to react in 2,000 g of a mineral oil (having a kinematic viscosity at 100° C. of 13.5 mm$^2$/sec), and dispersing the resultant urea compound uniformly. Additives were added to this base grease with the composition shown in Table 5, and then the resultant compound was adjusted with a three roll mill to JIS consistency No. 1 grade.

In the preparation of the lubricating grease of the inventive product 4, grease was obtained by causing 60.3 g of diphenylmethane-4,4'-diisocyanate, 65.5 g of stearylamine, and 24.1 g of cyclohexylamine to react in 2,000 g of a mineral oil (having a kinematic viscosity at 100° C. of 13.5 mm$^2$/sec), and dispersing the resultant urea compound uniformly. Additives were added to this base grease with the composition shown in Table 5, and then the resultant compound was adjusted with a three roll mill to JIS consistency No. 1 grade.

Further, Table 3 below shows testing conditions. Table 4 below shows results of the test. In Table 4, the mark "⊚" represents "excellent," the mark "o" represents "good," specifically, means that a corresponding constant velocity universal joint can be used, and the mark "x" represents "bad," specifically, a corresponding constant velocity universal joint cannot be used.

TABLE 3

| Testing condition | Torque Nm | Number of rotations rpm | Operating angle |
|---|---|---|---|
| High load durability | 800 | 260 | 6° |
| Low load durability | 190 | 1800 | 6° |
| High angle durability | 560 | 50 | Rocking within a range of from 0° to 48° (0.1 Hz) |
| Measurement of transmission efficiency | 300 | 300 | 6° |
| Constant velocity universal joint as a sample | Fixed type constant velocity universal joint of an undercut free type, which has a nominal diameter of 22.2 (refer to JASO C 304-89) | | |

The grease for the comparative product 1 mainly contains an additive likely to act under the high load condition, and hence low load durability and transmission efficiency are deteriorated. Transmission efficiencies were used as indices indicating frictional coefficients of the greases. The grease for the inventive product 1 is obtained by further adding an additive, which acts from a low temperature range, to the grease for the comparative product 1 and by reducing a MCA rate to 4%. With reference to Table 4, it can be understood that this composition satisfies all the test parameters of the inventive product 1. The grease for the comparative product 2 is obtained by reducing the MCA rate to 3%. With reference to Table 4, it can be understood that the inventive product 2 has performance higher than that of the inventive product 1, and that the comparative product 2 using the grease in which the MCA rate is reduced to 1.5% has a shorter life. The grease for the inventive product 3 is obtained by adding a vegetable oil to that for the inventive product 2. With reference to Table 4, it can be understood that the inventive product 3 has a longer life under the low load condition than that of the inventive product 2. Durabilities of the comparative product 3, which comprises the balls having the surface roughness of Ra 0.16, are significantly deteriorated. The grease for the inventive product 4 contained a urea-based thickener different from that for the inventive product 3, and the inventive product 4 was equivalent in performance to the inventive product 3.

TABLE 4

| | Roughness Ra of each member | Comparative Product 1 | Inventive Product 1 | Inventive Product 2 | Comparative Product 2 | Inventive Product 3 | Comparative Product 3 | Inventive Product 4 |
|---|---|---|---|---|---|---|---|---|
| Member | Surface roughness of balls | 0.08 First ball | 0.08 First ball | 0.08 First ball | 0.08 First ball | 0.08 First ball | 0.16 Second ball | 0.08 First ball |
| | Surface roughness of outer joint member | 0.6 | 0.6 | 0.6 | 0.6 | 0.6 | 0.6 | 0.6 |
| | Surface roughness of inner joint member | 0.5 | 0.5 | 0.5 | 0.5 | 0.5 | 0.5 | 0.5 |
| | Surface roughness of cage windows | 0.6 | 0.6 | 0.6 | 0.6 | 0.6 | 0.6 | 0.6 |
| Lubricant | Base oil (mineral oil) | ○ | ← | ← | ← | ← | ← | ← |
| | Thickener | ○ | ← | ← | ← | ← | ← | ← |
| | MoDTC | ○ 2.5% | ← | ← | ← | ← | ← | ← |
| | ZnDTP | N/A | ○ 1.0% | ← | ← | ← | ← | ← |
| | MCA | ○ 5.0% | ○ 4.0% | ○ 3.0% | ○ 1.5% | ○ 3.0% | ← | ○ 3.0% |
| | $MoS_2$ | N/A | ○ 0.5% | ← | ← | ← | ← | ← |
| | Ca sulfonate | ○ 2.0% | ← | ← | ← | ← | ← | ← |
| | Vegetable oil | N/A | N/A | N/A | N/A | ○ 2.0% | ← | ○ 2.0% |
| Test parameter | High load durability | ○ | ○ | ⊚ | X | ⊚ | X | ⊚ |
| | Low load durability | X | ○ | ○ | ○ | ⊚ | X | ⊚ |
| | High angle durability | ○ | ○ | ⊚ | X | ⊚ | X | ⊚ |
| | Transmission efficiency | X | ○ | ⊚ | ⊚ | ⊚ | X | ⊚ |

The fixed type constant velocity universal joint according to the embodiments of the present invention is used, for example, for a drive shaft of a power transmission device for automobiles and industrial machines. A lubricating grease is sealed inside the joint. The fixed type constant velocity universal joint may comprise those of the undercut free type and the Birfield type.

| Reference Signs List | |
| --- | --- |
| 31 | inner surface |
| 32, 35 | track groove |
| 32a | curved portion |
| 32b | straight portion |
| 33 | outer joint member |
| 34 | outer surface |
| 35a | straight portion |
| 35b | curved portion |
| 36 | inner joint member |
| 37 | ball |
| 38 | cage |

The invention claimed is:

1. A fixed constant velocity universal joint, comprising:
an outer joint member having an inner surface provided with track grooves;
an inner joint member having an outer surface provided with track grooves paired with the track grooves of the outer joint member;
a plurality of balls for transmitting torque, the plurality of balls being interposed between the track grooves of the outer joint member and the track grooves of the inner joint member; and
a cage for holding the plurality of balls, the cage being interposed between the inner surface of the outer joint member and the outer surface of the inner joint member,
the fixed constant velocity universal joint comprising a lubricating grease sealed therein,
wherein the plurality of balls comprises eight balls,
wherein a spherical angle of the outer joint member is within a range from 17° to 18.5°,
wherein the outer joint member comprises a spherical inlet provided with cut out portions for incorporation of the cage,
wherein a surface roughness of each of the plurality of balls is Ra 0.15 μm or less,
wherein a surface roughness of a counterpart surface on which a corresponding one of the plurality of balls rolls is within a range from Ra 0.4 μm to Ra 1.8 μm so as to be higher than the surface roughness of each of the plurality of balls, and
wherein an additive composition of the lubricating grease comprises a base oil, a diurea compound, molybdenum dithiocarbamate, zinc dialkyldithiophosphate, melamine cyanurate, molybdenum disulfide, and calcium salt of alkylaromatic sulfonic acid.

2. A fixed constant velocity universal joint according to claim 1, wherein the additive composition of the lubricating grease comprises the melamine cyanurate at 2 to 4% by weight, the molybdenum disulfide at 0.2 to 2.5% by weight, the molybdenum dithiocarbamate at 1 to 3% by weight, the zinc dialkyldithiophosphate at 0.2 to 1.5% by weight, and the calcium salt of the alkylaromatic sulfonic acid at 0.5 to 3.5% by weight.

3. A fixed constant velocity universal joint according to claim 2, wherein the additive composition of the lubricating grease further comprises a vegetable oil.

4. A fixed constant velocity universal joint according to claim 3, wherein the fixed constant velocity universal joint comprises an undercut free fixed constant velocity universal joint in which a bottom surface of each of the track grooves of the outer joint member and a bottom surface of each of the track grooves of the inner joint member each comprise a curved portion and a straight portion.

5. A fixed constant velocity universal joint according to claim 2, wherein the base oil of the additive composition comprises a mineral oil.

6. A fixed constant velocity universal joint according to claim 5, wherein the fixed constant velocity universal joint comprises an undercut free fixed constant velocity universal joint in which a bottom surface of each of the track grooves of the outer joint member and a bottom surface of each of the track grooves of the inner joint member each comprise a curved portion and a straight portion.

7. A fixed constant velocity universal joint according to claim 2, wherein the fixed constant velocity universal joint comprises an undercut free fixed constant velocity universal joint in which a bottom surface of each of the track grooves of the outer joint member and a bottom surface of each of the track grooves of the inner joint member each comprise a curved portion and a straight portion.

8. A fixed constant velocity universal joint according to claim 1, wherein the additive composition of the lubricating grease further comprises a vegetable oil.

9. A fixed constant velocity universal joint according to claim 8, wherein the base oil of the additive composition comprises a mineral oil.

10. A fixed constant velocity universal joint according to claim 9, wherein a center of curvature of each of the track grooves of the outer joint member and a center of curvature of a corresponding one of the track grooves of the inner joint member are offset to each other with respect to a joint axial center line to the opposite sides in a radial direction by equal distances with respect respectively to a corresponding one of the track grooves of the outer joint member and a corresponding one of the track grooves of the inner joint member.

11. A fixed constant velocity universal joint according to claim 8, wherein the fixed constant velocity universal joint comprises an undercut free fixed constant velocity universal joint in which a bottom surface of each of the track grooves of the outer joint member and a bottom surface of each of the track grooves of the inner joint member each comprise a curved portion and a straight portion.

12. A fixed constant velocity universal joint according to claim 1, wherein the base oil of the additive composition comprises a mineral oil.

13. A fixed constant velocity universal joint according to claim 12, wherein the fixed constant velocity universal joint comprises an undercut free fixed constant velocity universal joint in which a bottom surface of each of the track grooves of the outer joint member and a bottom surface of each of the track grooves of the inner joint member each comprise a curved portion and a straight portion.

14. A fixed constant velocity universal joint according to claim 1, wherein the fixed constant velocity universal joint comprises an undercut free fixed constant velocity universal joint in which a bottom surface of each of the track grooves of the outer joint member and a bottom surface of each of the track grooves of the inner joint member each comprise a curved portion and a straight portion.

15. A fixed constant velocity universal joint according to claim 14, wherein a center of curvature of each of the track grooves of the outer joint member and a center of curvature of a corresponding one of the track grooves of the inner joint member are offset to each other with respect to a joint axial center line to opposite sides in a radial direction by equal distances with respect a corresponding one of the track grooves of the outer joint member and a corresponding one of the track grooves of the inner joint member.

16. A fixed constant velocity universal joint according to claim 15, wherein a raw material for the cage comprises carbon steel having a carbon content of 0.46% by weight or more and 0.50% by weight or less, the raw material having a core portion which has a hardness in a range from HRC 56 to HRC 60 after quenching.

* * * * *